(12) United States Patent
Takahashi et al.

(10) Patent No.: US 7,863,367 B2
(45) Date of Patent: Jan. 4, 2011

(54) SURFACE TREATED CALCIUM CARBONATE AND A RESIN COMPOSITION CONTAINING THE SAME

(75) Inventors: Yoichi Takahashi, Hyogo (JP); Yuusuke Hayashi, Hyogo (JP); Katsunori Fukumoto, Hyogo (JP)

(73) Assignee: Maruo Calcium Company Limited, Akashi-Shi (JP)

( * ) Notice: Subject to any disclaimer, the term of this patent is extended or adjusted under 35 U.S.C. 154(b) by 0 days.

(21) Appl. No.: 10/483,985

(22) PCT Filed: Oct. 3, 2003

(86) PCT No.: PCT/JP03/12710

§ 371 (c)(1),
(2), (4) Date: Jan. 22, 2004

(87) PCT Pub. No.: WO2004/031303

PCT Pub. Date: Apr. 15, 2004

(65) Prior Publication Data

US 2004/0242748 A1    Dec. 2, 2004

(30) Foreign Application Priority Data

Oct. 3, 2002    (JP) ............................. 2002-290860

(51) Int. Cl.
C09C 1/02    (2006.01)
(52) U.S. Cl. ...................... 524/425; 423/430
(58) Field of Classification Search ......... 524/425–427; 423/430, 268, 274, 266, 269, 432; 106/465
See application file for complete search history.

(56) References Cited

U.S. PATENT DOCUMENTS

| 4,138,521 | A | * | 2/1979 | Brown | .......................... 428/159 |
|---|---|---|---|---|---|
| 4,386,169 | A | * | 5/1983 | Artur et al. | .................. 523/200 |
| 4,657,963 | A | * | 4/1987 | Matsumoto et al. | ......... 524/406 |
| 6,342,100 | B1 | * | 1/2002 | Nover et al. | ................. 106/464 |
| 6,498,211 | B2 | * | 12/2002 | Kobayashi et al. | .......... 524/588 |
| 6,551,676 | B1 | * | 4/2003 | Yamakawa et al. | ......... 428/40.1 |

FOREIGN PATENT DOCUMENTS

| JP | 9-169925 | 6/1997 |
|---|---|---|
| JP | 11-60950 | 3/1999 |
| JP | 2001-158863 | 6/2001 |
| JP | 2002-220547 | 8/2002 |
| JP | 2002-235015 | 8/2002 |

* cited by examiner

*Primary Examiner*—Stuart Hendrickson
(74) *Attorney, Agent, or Firm*—Kratz, Quintos & Hanson, LLP

(57) ABSTRACT

A surface treated calcium carbonate in which calcium carbonate is surface treated with a fatty acid surface treatment agent satisfying the following equation (a), and the surface treated calcium carbonate satisfying the following equation (b) is provided:

$$C12+C14\ 85(\%) \quad\quad (a)$$

and $$Pv\ 90(\%), \quad\quad (b)$$

$C12$ is a ratio of a fatty acid surface treatment agent having an alkyl group of 12 carbon atoms, $C14$ is a ratio of a fatty acid surface treatment agent having an alkyl group of 14 carbon atoms, and $Pv$ is a ratio of a volume (vol. %) precipitated in hexane.

The surface treated calcium carbonate of the present invention can provide the resin compositions having slip resistance and slump resistance with a good balance between them, especially the resin compositions having an excellent slip resistance.

14 Claims, 2 Drawing Sheets

SURFACE TREATED CALCIUM CARBONATE AND A RESIN COMPOSITION CONTAINING THE SAME

TECHNICAL FIELD

The present invention relates to a surface treated calcium carbonate and a resin composition containing the same. More particularly it relates to a surface treated calcium carbonate, which, by being surface treated with a specific surface treatment agent, can provide particularly excellent slip resistance and slump resistance, naturally including viscosity and thixotropy, when it is mixed in a resin composition, for example, sealing materials represented by a modified silicone or plastisols represented by vinyl chloride plastisol and acrylic plastisol, and relates to a resin composition containing the surface treated calcium carbonate.

BACKGROUND ART

Calcium carbonate is widely used as a filler or a pigment of plastics, coating materials, ink, sealants, adhesives, plastisols, paper, rubber, etc. Particularly, calcium carbonate is an important material as a filler of synthetic resins.

In resin compositions blended with calcium carbonate, there are curable type resin compositions for sealants, adhesives, coating materials, waterproofing agents, floors, plastisols, etc. For example, with respect to the sealants, the sealant is widely used in the fields of constructions, automobiles, floors, etc., for the purpose of waterproofing and sealing. When it is used in these fields, it is often applied to a vertical area, and therefore it needs not to run during a period of time from its application to curing as a matter of course and needs to have high viscosity and high thixotropy to a proper extent. But, when it has high viscosity and thixotropy, adhesion between a member to be applied and the resin composition is often reduced and this generally leads to deteriorate slip resistance, and therefore a sealing material having both of excellent slump resistance and slip resistance is desired.

And, for example, particularly in plastisols for automobile bodies, thermoplastic polymer particles are generally used, and spray coating is usually common and it becomes important to prevent sags and slip of sols after spraying.

As the thermoplastic polymer particles, there have been frequently used polyvinyl chlorides represented by copolymers of vinyl chloride polymer or vinyl chloride with vinyl acetate because it has superior anticorrosion characteristics, and can fill a crevice in a joint portion well and form a relatively thick film, but in recent years, the stream of post-vinyl chloride is accelerated from environmental issues, and as an alternative thereto, an acrylic sol, a urethane sol, a modified silicone sol, etc. have been developed. Particularly, an acrylic plastisol, which is formed by dispersing acrylic polymer particles together with a filler in a plasticizer has been developed and commercialized. Since the acrylic plastisol has forms, workability and processability equivalent to a polyvinyl chloride composition, it has been studied to be used as an alternative to the polyvinyl chloride composition and a coating, having strength and durability compatible to a polyvinyl chloride plastisol, has become available.

However, since the acrylic polymer particles used in the acrylic plastisol has a weak intermolecular force acting on between molecules in comparison to vinyl chloride polymer particles, a plasticizer is apt to be captured in between molecules, and since the captured plasticizer bleeds with time, the acrylic plastisol has a problem of tending to slip due to this bled plasticizer in forming a film by heat.

On the other hand, in Japanese Unexamined Patent Publication No. 2002-235015, the surface coated calcium carbonate, which is coated with a mixture of a saturated fatty acid (salt) and an unsaturated fatty acid (salt) and further coated with an organic compound such as a phthalic acid ester, etc., is proposed in an attempt to provide calcium carbonate capable of imparting dispersibility, adhesion and viscosity stability.

Also, in Japanese Unexamined Patent Publication No. 11-60950, there is proposed calcium carbonate surface treated with at least one kind selected from sulfate ester type anion surfactants and sulfonic acid type anion surfactants, and a fatty acid (salt) in order to attain a curable composition, which has a long pot life and proper viscosity and is good in workability.

Further, in Japanese Unexamined Patent Publication No. 2002-220547, there is proposed the surface treated chain calcium carbonate surface treated with organic treating agents such as a fatty acid, a resin acid and a surfactant to provide a coat with slip resistance, adaptability to joints and high strength.

However, the above-mentioned products cannot be necessarily said to be satisfactory in point of the effectiveness of improving slip resistance.

Thus, fillers and resin compositions which can resolve the above problems are desired.

Considering such a situation, the present invention provides surface treated calcium carbonate, which can develop particularly excellent slip resistance when it is mixed, for example, in sealing materials represented by a modified silicone or plastisols represented by a polyvinyl chloride plastisol and a acrylic plastisol, and provides a resin composition containing the surface treated calcium carbonate.

The present inventors conducted studies earnestly in order to resolve the above-mentioned problems and consequently have known that a ratio of the fatty acid surface treatment agent having specific carbon atoms, which constitutes a surface treatment agent, has a large effect on the slip resistance and found out that it is possible to resolve the above problems by using calcium carbonate surface treated with a surface treatment agent containing a fatty acid having specific carbon atoms, and have completed the present invention.

DISCLOSURE OF THE INVENTION

The claim 1 of the present invention encompasses a surface treated calcium carbonate in which calcium carbonate is surface treated with a fatty acid surface treatment agent satisfying the following equation (a), and the surface treated calcium carbonate satisfies the following equation (b):

$$C12 + C14 \geqq 85(\%) \qquad (a)$$

and $$Pv \leqq 90(\%), \qquad (b)$$

wherein

C12 is a ratio of a fatty acid surface treatment agent having an alkyl group of 12 carbon atoms, C14 is a ratio of a fatty acid surface treatment agent having an alkyl group of 14 carbon atoms, and Pv is a ratio of a volume (vol. %) precipitated in hexane.

The claim 2 of the present invention encompasses the surface treated calcium carbonate according to claim 1, wherein the surface treatment agent is a fatty acid surface treatment agent satisfying the following equation (c):

$$C12+C14 \geq 95(\%). \quad (c)$$

The claim 3 of the present invention encompasses the surface treated calcium carbonate according to claim 1 or 2, wherein the surface treatment agent further satisfies the following equation (d):

$$\{C12/(C12+C14)\} \times 100 \geq 80(\%). \quad (d)$$

The claim 4 of the present invention encompasses the surface treated calcium carbonate according to claim 1 or 2, wherein the surface treatment agent further satisfies the following equation (e):

$$\{C12/(C12+C14)\} \times 100 \geq 90(\%). \quad (e)$$

The claim 5 of the present invention encompasses the surface treated calcium carbonate according to claim 1 or 2, wherein the surface treatment agent further satisfies the following equation (f):

$$\{C12/(C12+C14)\} \times 100 \geq 95(\%). \quad (f)$$

The claim 6 of the present invention encompasses the surface treated calcium carbonate according to any one of claims 1 to 5, wherein the surface treated calcium carbonate satisfies the following equation (g):

$$Pv \leq 80(\%). \quad (g)$$

The claim 7 of the present invention encompasses the surface treated calcium carbonate according to any one of claims 1 to 5, wherein the surface treated calcium carbonate satisfies the following equation (h):

$$Pv \leq 70(\%). \quad (h)$$

The claim 8 of the present invention encompasses the surface treated calcium carbonate according to any one of claims 1 to 7, wherein the fatty acid surface treatment agent is at least one selected from a fatty acid and a fatty acid salt.

The claim 9 of the present invention encompasses the surface treated calcium carbonate according to any one of claims 1 to 8, wherein the surface treated calcium carbonate is in use for resins.

The claim 10 of the present invention encompasses the surface treated calcium carbonate according to any one of claims 1 to 8, wherein the resin is a curable resin.

The claim 11 of the present invention encompasses a resin composition comprises blending a resin with the surface treated calcium carbonate according to any one of claims 1 to 8.

The claim 12 of the present invention encompasses the resin composition according to claim 11, wherein the resin is a curable resin.

The claim 13 of the present invention encompasses the resin composition according to claim 12, wherein the curable resin is a modified silicone.

The claim 14 of the present invention encompasses the resin composition according to claim 12, wherein the curable resin is a plastisol.

Another embodiment of the present invention encompasses the resin composition, wherein the plastisol is an acrylic plastisol.

BEST MODES FOR CARRYING OUT THE INVENTION

Figure 1:
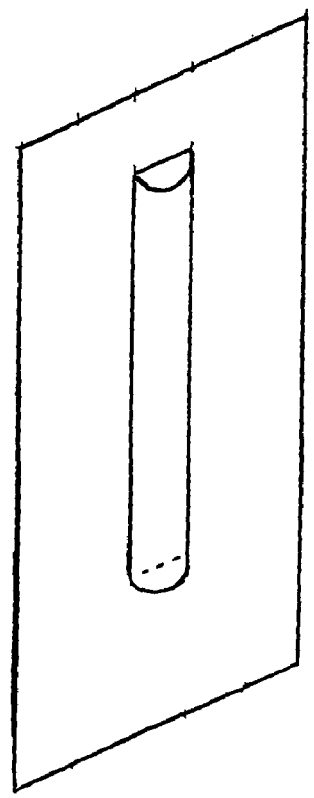
FIG. 1 is a perspective view showing a state immediately after a resin composition is applied and FIGS. 2 and 3 are a bottom view and a side view of FIG. 1, respectively.
Figure 2:
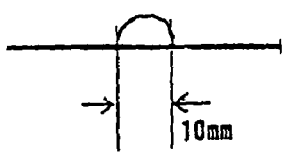
Figure 3:
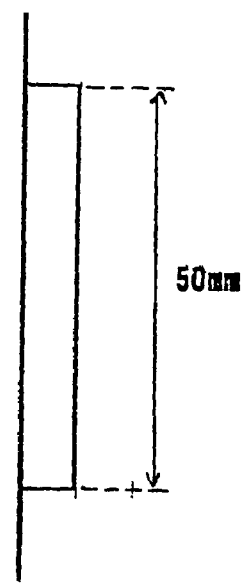
Figure 4:
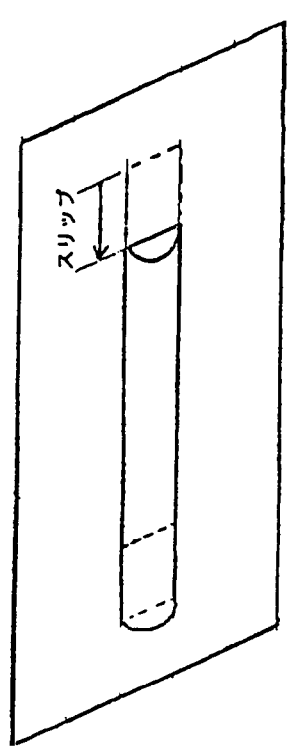
FIG. 4 is a perspective view showing a state of slip of the applied resin composition and FIG. 5 is a perspective view showing a state of slump of the applied resin composition.
Figure 5:
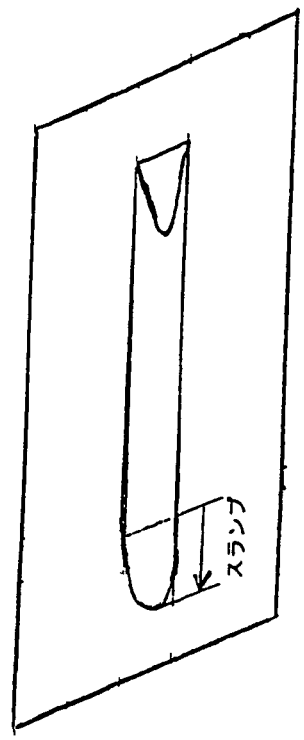
Figure 6:
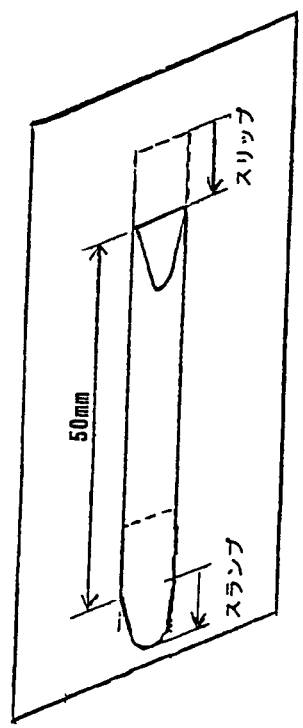
FIG. 6 is a perspective view showing a state of both slip and slump generated.

Hereinafter, the present invention will be specifically described in detail.

The surface treated calcium carbonate of the present invention is characterized in that calcium carbonate is surface treated with a surface treatment agent satisfying the following equation (a) and that the obtained surface treated calcium carbonate satisfies the following equation (b):

$$C12+C14 \geq 85(\%) \quad (a)$$

and $$Pv \leq 90(\%), \quad (b)$$

wherein

C12 is a ratio of a fatty acid surface treatment agent having an alkyl group of 12 carbon atoms, C14 is a ratio of a fatty acid surface treatment agent having an alkyl group of 14 carbon atoms, and Pv is a ratio of a volume (vol. %) precipitated in hexane.

And, the surface treated calcium carbonate of the present invention is characterized in that the surface treated calcium carbonate is preferably formed by surface treating with a surface treatment agent satisfying the following equation (c):

$$C12+C14 \geq 95(\%). \quad (c)$$

In the present invention, (C12+C14) %, which is a total of C12 and C14, is a weight ratio of a fatty acid surface treatment agent having alkyl groups of 12 carbon atoms and 14 carbon atoms in a total fatty acid composition to a total weight of fatty acid surface treatment agents measured by a gas chromatography. Specifically, 1 mg of the surface treated calcium carbonate and 2 μL of a 25 weight % water solution of TMAH (tetramethylammonium hydroxide) as an esterifying agent are put in an aluminum cell, and the mixture is thermally cracked at 300° C. in a column and vaporized, and then an alkyl composition is analyzed with a GC/MS (manufactured by Shimadzu Corporation) to determine a total weight % of C12 and C14 in a total fatty acid.

In the present invention, (C12+C14) %, which is a total of C12 and C14, needs to satisfy have a relationship of C12+C14≧85(%). When (C12+C14) is less than 85(%), affinity for nonpolar resins and solvents is lowered and the slip resistance performance of a resin composition, which is an object of the present invention, is not adequately attained. Therefore, it more preferably satisfies a relationship of (C12+C14)≧95 (%).

And, in the present invention, a ratio of a volume precipitated in hexane, Pv, needs to satisfy a relationship of Pv≦90 (%). The ratio of a volume precipitated in hexane described herein is a parameter representing a state being treated with a surface treatment agent to the surface of the calcium carbonate. Usually, fine calcium carbonate primary particles form secondary agglomerated particles and if surface treatment is not sufficiently applied to the secondary agglomerated particles, the surface treatment agent cannot coat the primary particles particle-by-particle and therefore most of the surface treatment agent is used for surface treatment of the secondary agglomerated particles. In such a case, an untreated surface tends to be exposed in a subsequent step, for example, a step of milling, or a step of mixing in the formulation of a sealant or a plastisol. When in such a condition, the surface treated calcium carbonate is mixed in a nonpolar resin or a solvent, the untreated surface catches liquid components and swells and consequently the surface treated calcium carbonate becomes difficult to precipitate. Since the surface treated calcium carbonate in such a state of inadequate treatment becomes very unstable in a condition of catching liquid components such as a plasticizer and a solvent, these liquid components tend to bleed out with time and consequentially a slip performance is deteriorated when mixed in a sealant or a plastisol.

Therefore, it is necessary to control the values of Pv to a certain level or lower, preferably Pv≦80(%), more preferably Pv≦70(%).

Incidentally, this parameter represents a wetting property in the case where the calcium carbonate is mixed in the resin composition of the present invention, and consequently as a test solvent, hexane, a nonpolar solvent, is most suitable also from the viewpoint of low volatility. Solvents such as methanol, ethanol and toluene cannot be used because there is little difference in precipitation between the states of being treated and thus judgment of these states becomes difficult.

In the present invention, a ratio of a volume precipitated in hexane, Pv, is determined as described below. That is, hexane (a reagent) and the surface treated calcium carbonate were charged in a ratio of 100 g/10 g into a 225 ml mayonnaise bottle, and the content was shaken at a shaking frequency of 300 times per minute for 10 minutes using RECIPRO SHAKER SR-2s (manufactured by TAITEC) and then the mixture is transferred into a 100 ml measuring cylinder up to 100 ml and is allowed to stand at 23° C. for 24 hours. Since the mixture is separated into a hexane layer and a precipitated layer after allowing to stand, a volume of the precipitated layer is measured, and a ratio of this measured volume to the total volume of 100 ml by percentage (%) is defined as Pv.

More preferable is the case where the surface treatment agent satisfies a relationship of {C12/(C12+C14)}×100≧80 (%). When {C12/(C12+C14)} is lower than 80(%), the slip resistance and the slump resistance may sometimes be deteriorated in mixing the surface treated calcium carbonate in a resin composition. Still more preferable is the case of {C12/(C12+C14)}×100≧90(%), and the most preferable is the case of {C12/(C12+C14)}×100≧95 (%). That is, in C12 and C14, the surface treatment agent of C12 is superior in a balance between a hydrophilic group and a lipophilic group and consequently the higher a value of C12, the better slip resistance is attained.

As raw materials of the fatty acid treatment agents of C12 and C14 in the present invention, a palm oil, a palm seed oil and a babassu oil are preferred, but a beef tallow, a lard, a palm oil, a castor oil and a rape oil, which are usual, may also be used. Further, these fatty acids may be natural substances or synthesized substances, and more preferably these fatty acids are substances, net portion of which is manipulated by eliminating an unsaturated portion through hydrogenation or separating through distillation as required. These treatment agents may be used in combination of two or more to satisfy a scope of the present invention.

As a form of a fatty acid used in the present invention, a form of amine salt, ammonium salt or ester may be used, but the fatty acid is preferably at least one of a fatty acid or a fatty acid metallic salt. As the fatty acid metallic salt, there are exemplified alkaline metal salts such as sodium salt, potassium salt, etc., and alkaline earth metal salts such as calcium salt, magnesium salt, etc.

C12 is a lauric acid or a laurate and C14 is a myristic acid or a myristate. Generally, substances containing C12 in an amount 50% or more are generally called a lauric acid and substances containing C14 in an amount 50% or more are generally called a myristic acid. Though these compounds are sometimes used as a surface treatment agent of calcium carbonate, industrially, substances in which (C12+C14) is less than 80%, have been used. Particularly, a substance containing (C12+C14) in a high amount has not been commonly used because of high cost, etc. Further, a substance containing C12 in a high amount has not been used as a surface treatment agent since it also has a problem of handling as an alkaline metal salt. For example, though laurates are described in Japanese Unexamined Patent Publication No. 2002-235015 (paragraph number 0119), Japanese Unexamined Patent Publication No. 11-60950 (paragraph number 0016), and Japanese Unexamined Patent Publication No. 2002-220547 (paragraph number 0041), contents of C12 are not referred to at all, and therefore in this point, the present invention is essentially different from the prior art.

The surface treated calcium carbonate of the present invention preferably satisfies the following equation (i):

$$2 \leq Sw \leq 70 \ (m^2/g), \quad (i)$$

wherein

Sw: BET specific surface area ($m^2/g$) of the surface treated calcium carbonate measured by a nitrogen absorption method.

The equation (i) concerns the BET specific surface area of the surface treated calcium carbonate of the present invention, and when the specific surface area is less than 2 $m^2/g$, there may be cases where the effect of imparting viscosity in blending a resin composition with the surface treated calcium carbonate cannot be expected, and when it is more than 70 $m^2/g$, since primary particles become too fine and an agglomeration force between particles becomes strong, stability with time in the case of being powdered is poor and this may result in a decrease in dispersibility. Therefore, the above specific surface area more preferably satisfies a relationship of $5 \leq Sw \leq 50$ ($m^2/g$), still more preferably $7 \leq Sw \leq 40$ ($m^2/g$).

Though an amount of the surface treatment agent in the present invention, required for surface treatment of calcium carbonate varies with the specific surface area, it is preferred to satisfy the following equation (j):

$$1.0 \leq As \leq 6.0 \ (mg/m^2), \quad (j)$$

wherein

As: An amount of the surface treatment agent used for surface treatment of calcium carbonate per a unit surface area of calcium carbonate ($mg/m^2$), which is expressed as Tg/Sw, and Tg: A weight of the surface treatment agent occupying in the surface treated calcium carbonate of 1 g (mg/g).

The equation (j) indicates the amount of the surface treatment agent per a unit specific surface area of the surface treated calcium carbonate of the present invention, and when it is less than 1.0 $mg/m^2$, this may cause irregularities in viscosity and thixotropy due to insufficient surface treatment, and on the other hand when it is more than 6.0 $mg/m^2$, liberation of the surface treatment agent from the calcium carbonate into resin ingredients or plasticizer ingredients occurs since the amount of the agent for surface treatment per a unit surface area is too much, and therefore the slip performance may be deteriorated. Accordingly, the above As more preferably satisfies a relationship of $1.3 \leq As \leq 5.0$ (mg/m$^2$), still more preferably $1.5 \leq As \leq 4.0$ (mg/m$^2$).

In addition, Sw and Tg are values obtained by the following methods:

Sw: 0.3 g of a sample is weighed and put in a glass pellet cell having an effective volume of 0.45 ml, and dried at 180° C. for one hour in an atmosphere of nitrogen and then the specific surface area is measured through one point technique using a BET specific surface area meter "NOVA 2000" (manufactured by Yuasa Ionics Inc.).

Tg: A decrease in weight due to heat in a range of 200 to 500° C., measured when a sample is raised in temperature at a heating rate of 15° C./min. from room temperature to 510° C. in TAS-100 (manufactured by Rigaku Corporation) after 0.15 g of the sample is weighed and put in an aluminum cell with a size of 5.2 mm in outer diameter and 2.5 mm in height. This value is represented by a change in weight (mg) in 1 g of the surface treated calcium carbonate (unit: mg/g).

A surface treatment agent in the present invention may be used in conjunction with another surfactants, emulsifiers, etc. as required and its mixing ratio is not specifically limited, but it is desirable that the surface treatment agent of the present invention usually constitutes 50% or more of the total surface treatment agent to have the balance between viscosity/thixotropy and slip resistance.

Further, the surface treated calcium carbonate used in the present invention more preferably satisfies the following equations (k) and (l):

$$0.005 \leq Dxp \leq 0.30 \ (\mu m) \quad (k)$$

and $$10 \leq Dyp/Dxp \leq 150, \quad (l)$$

wherein

Dxp: In mercury intrusion porosimetry, an average pore diameter at which an incremental quantity of mercury intrusion (cumulative pore volume incremental quantity/logarithmic average pore diameter) becomes a maximum value (Dys) in a pore distribution with a range of 0.001 to 5.0 μm in pore size Dyp: Maximum incremental quantity of mercury intrusion (ml/g) Dyp/Dxp: Average pore quantity Equations (k) and (l) become a measure to know a state of dispersion of the surface treated calcium carbonate of the present invention. The equation (k) indicates an average pore diameter (Dxp) at which a mercury intrusion quantity becomes a maximum value (Dyp) in a pore distribution with a range of 0.001 to 5.0 μm in pore size, which is measured by a mercury intrusion porosimetry (porosimeter), and represents fineness of a crevice between the particles of the surface treated calcium carbonate. This means a particle size distribution of primary particles or a distribution of secondary agglomerated particles and when the average pore size is smaller than 0.005 μm, problems may occur in stability with time since primary particles are too fine, and on the other hand when the average pore size is larger than 0.30 μm, this case may yield problems of a decrease in viscosity and a deterioration of slump resistance since primary particles are too large or an abundance of agglomerated secondary particles exist. Therefore, more preferably, the average pore size has a relationship of $0.01 \leq Dxp \leq 0.20$ (μm), still more preferably, $0.015 \leq Dxp \leq 0.15$ (μm). Meanwhile, the quantity of mercury intrusion means a pore volume incremental quantity, it is expressed as an equation of (cumulative pore volume incremental quantity/logarithmic average pore diameter) (unit: ml/g). Naturally, since it is conceivable that the smaller a pore size, the smaller a size of total pores, the maximum mercury intrusion quantity (Dyp) depends on a pore size.

The equation (l) become a measure indicating a number of an average pore sizes of the equation (k). As described above, as a pore size becomes smaller, a volume of a pore also becomes smaller, it is possible to take the pore quantity (number), required in the present invention, as a measure by taking account of the maximum mercury intrusion quantity (Dyp) and the average pore diameter of the equation (k). Therefore, when Dyp/Dxp is smaller than 10, since the average pore size is too large, there are problems in uniformity and dispersibility of particles and there may be cases where dispersibility in the resin composition and high viscosity property cannot be attained, and on the other hand, when it is larger than 150, problems may occur in stability with time of the primary particles or secondary particles since the average pore size is extremely fine. Accordingly, preferably, the average pore quantity has a relationship of $20 \leq Dyp/Dxp \leq 120$, more preferably, $30 \leq Dyp/Dxp \leq 100$.

Incidentally, an apparatus of a mercury intrusion (porosimeter) used and main measuring conditions are as follows.

<Apparatus for Measurement>
Model 9520 manufactured by Shimadzu Corporation
<Main Measuring Factors>
Purity of mercury=99.99(%)
Surface tension of mercury=480 (dyns/cm)
Contact angle of mercury=135 degrees
Cell constant=10.79 (μl/pF)
Sample weight: about 0.10 g of each sample is weighed A method of production of calcium carbonate used in the present invention is not specifically limited and the calcium carbonate can be produced by a known method. For example, heavy calcium carbonate obtained by mechanically milling limestone may be used or precipitated calcium carbonate synthesized chemically may also be used. As a method of production of the precipitated calcium carbonate, for example, a method of preparing calcium carbonate by adding calcium chloride to sodium carbonate may be used or a carbon dioxide carbonation method of preparing calcium carbonate by injecting carbon dioxide into water slurry of calcium hydroxide may be used.

And, as described, for example, in Japanese Unexamined Patent Publication No. 10-72215, a compound obtained by completing a carbonation reaction by adding an agent forming a complex with calcium in water slurry of calcium hydroxide may be adopted. That is, this is calcium carbonate in fine particle form, obtained by a method in which in producing calcium carbonate by injecting carbon dioxide into water suspension of calcium hydroxide, a substance coordinating with a metal ion to form a complex is added to water suspension of calcium hydroxide and calcium carbonate is produced by a carbonation reaction and then the produced calcium carbonate is aged.

The calcium carbonate produced as described above is aged until an objective particle diameter or grain size is reached as required. Here, preferably, the calcium carbonate is well dispersed in a state prior to surface treatment in order to provide effects of the present invention outstandingly. Therefore, the calcium carbonate before surface treatment preferably satisfies the following equation (m):

$$0.5 \leq D50 \leq 5.0 \ (\mu m). \quad (m)$$

D50: 50% average particle size measured with Microtrac FRA Laser Particle Size Analyzer (manufactured by Nikkiso Co., Ltd.)

D50 is a measure to represent a degree of dispersion of the calcium carbonate in slurry. A smaller D50 means that secondary agglomeration becomes fine and homogeneous. When D50 is smaller than 0.5 μm, particles approaches to a monodispersed state, but in the case of blending sealants or plastisols with the calcium carbonate surface treated in this state, there may be cases where conversely, viscosity and thixotropy become hard to develop because of excessive dispersion. When D50 is larger than 5.0 μm, secondary agglomeration is heavy and in the case of blending sealants or plastisols with the calcium carbonate surface treated in this condition of secondary agglomeration, there may also be cases of resulting in reductions of viscosity and thixotropy because the secondary agglomerated particles behaves as if a single particle. Therefore, D50 preferably satisfies a relationship of $0.8 \leqq D50 \leqq 4.0$ (μm), more preferably a relationship of $1.0 \leqq D50 \leqq 3.0$ (μm).

And, the BET specific surface area of calcium carbonate is preferably 2 to 100 $m^2/g$ at a immediately prior stage to surface treatment. When this specific surface area is smaller than 2 $m^2/g$, there is a high probability that the BET specific surface area, after the calcium carbonate is powdered, does not have a range of 2 $m^2/g$ or larger, which is a preferable range of the present invention, and therefore there may be cases where the effects of imparting viscosity and slump resistance in blending a resin composition with the surface treated calcium carbonate are low. And, when this BET specific surface area is larger than 100 $m^2/g$, there is a high probability that the BET specific surface area, after the calcium carbonate is powdered, does not have a range of 70 $m^2/g$ or smaller, which is a preferable range of the present invention, and therefore there may be cases where stability with time in the case of being powdered becomes poor and problems may arise in respect of dispersibility.

As for a measuring method of the BET specific surface area, for example, in the case of slurry form, about 30 g of slurry is put on a flat dish and dried until water is adequately vaporized in a microwave oven or an oven controlled to 100° C. and the dried slurry is milled in a mortar to be powdered, and the BET specific surface area may be measured by the same method as in Sw described above.

The calcium carbonate prepared as described above is surface treated using the surface treatment agent of the present invention, and then powdered through processes of dehydrating, drying and milling according to normal procedures, but the surface treated calcium carbonate may be produced by any method as long as ultimately it satisfies a relationship of $Pv \leqq 90(\%)$. Therefore, the method of production is not specifically limited except for using the surface treatment agent of the present invention and as the surface treatment, any of a wet or dry type may be used. After the surface treatment, the calcium carbonate is dehydrated and then dried according to normal procedures.

It is necessary for the surface treatment agent to adequately penetrate into the secondary agglomerated particles to treat the calcium carbonate adequately with the treatment agent of the present invention, and the treatment effect becomes remarkable when heat quantity applied in a drying step is a certain level or larger. Therefore, to attain sufficient effects of the present invention, it is preferred that the calcium carbonate is dried at a temperature of 100° C. or higher with sufficient expenditure of time. Though it is necessary to spend longer time on drying in order to attain desired physical properties by drying at a temperature of lower than 100° C., this may lower a drying efficiency and take much running costs more than necessary. And, the calcium carbonate can also be dried with a drier of a type drying instantly with hot air of an elevated temperature (150° C. or higher), but if a residence time of calcium carbonate is short, the treatment agent penetrates less into the agglomerated particles and the effect becomes hard to develop, and there is a possibility of resulting in fluctuations of the state of being treated. Further, in methods such as freeze-drying, vacuum drying and air drying, penetration of the surface treatment agent becomes more difficult and it takes significant time or requires another additional energy to attain a desired value of Pv. Consequently, preferably, driers having a sufficient residence time such as an oven drier, a Henschel mixer, a band drier and a paddle drier are most suitable for drying in the present invention.

The surface treated calcium carbonate dried by the above-mentioned method is powdered through a milling step. A procedure of milling may be conducted following a normal technique and a pin mill, a hammer mill or the like is used.

The surface treated calcium carbonate obtained as described above is particularly suitable for a filler for resins, and is mixed in various resins, for example, resins for a sealant and resins for a plastisol to form resin compositions having excellent characteristics and properties.

Though the resin blended with the surface treated calcium carbonate of the present invention is not specifically limited, it can be expected that the present invention is more effective for resins having problems of a slip property since the effect of the present invention is to improve the slip property. For example, the present invention is more effective for sealing materials mainly applied to joints of construction materials or for plastisols mainly applied to bodies of automobiles. Particularly, in the sealing materials, the surface treated calcium carbonate of the present invention is most useful in a modified silicone and in plastisols, and it is most useful in an acrylic plastisol.

As the modified silicone, for example, there is exemplified a substance formed by introducing a reactive silyl group in an end of a PPG skeleton. The modified siliconic sealant is mainly composed of a modified silicone polymer, a plasticizer and a filler, and may further be blended with an adhesion improver, an age resister, a coloring agent, an antioxidant, a blowing agent, a diluent and an ultraviolet absorber as required.

An acrylic plastisol is composed of acrylic polymer particles, a plasticizer, a filler and an antislip agent, and may also be blended with a blocktype urethane resin and a curing agent as required, and further may be blended with another conventional additives known, for example, a coloring agent, an antioxidant, a blowing agent, a diluent and an ultraviolet absorber.

As the plasticizer composing the resin composition of the present invention, there can be used known plasticizers such as a phthalic acid ester plasticizer, a phosphoric acid ester plasticizer, an adipic acid ester plasticizer and a sebacic acid ester plasticizer.

As the phthalic acid ester plasticizer, there can be exemplified dimethyl phthalate (DMP), diethyl phthalate (DEP), dibutyl phthalate (DBP), dihexyl phthalate (DHP), di-2-ethylhexyl phthalate (DOP), diisodecyl phthalate (DIDP), butylbenzil phthalate (BBP), diisononyl phthalate (DINP), dinonyl phthalate (DNP), etc., and as the phosphoric acid ester plasticizer, there can be exemplified tricresyl phosphate (TCP), triphenyl phosphate (THP), trixylylene phosphate (TXP), etc., and as the adipic acid ester plasticizer, there can be exemplified dioctyl adipate (DOA), diisodecyl adipate (DIDA), etc., and as the sebacic acid ester plasticizer, there can be exemplified dibutyl sebacate (DBS), dioctyl sebacate (DOS), etc. And, as the plasticizer composing the resin composition of the present invention, there can also be used epoxy plasticizers such as an epoxidation soybean oil, benzoic acid plasticizers, polyester plasticizers, etc., and these are used alone or in combination of two or more. The phthalic acid plasticizers are particularly preferred.

As the filler, in addition to the surface treated calcium carbonate of the present invention, usual fillers such as precipitated calcium carbonate, heavy calcium carbonate, colloidal silica, talc, kaoline, zeolite, a resin balloon, a glass balloon, etc. are exemplified, and these are used singly or in combination of two or more.

As the coloring agent, for example, there can be used inorganic pigments such as titanium dioxide, carbon black, etc., and inorganic pigments such as azo pigments, phthalocyanines, etc. As the antioxidant, for example, there can be used phenolic antioxidants and amine antioxidants. As the blowing agent, there can be used blowing agents of the type generating gas by heating, for example, azo blowing agents such as azodicarbonamide, azobisformamide, etc. As the diluent, for example, there can be used solvents such as xylene, mineral turpentine, etc. As the ultraviolet absorber, there can be used benzotriazole absorbes.

As acrylic polymer particles composing the acrylic plastisol of the present invention, known acrylic polymer particles usually adopted as a substance forming an acrylic plastisol can be used. For example, a homopolymer and a copolymer of a monomer selected from an acrylic acid alkyl ester or an methacrylic acid alkyl ester can be used. As these monomers, there can be specifically exemplified methyl acrylate, ethyl acrylate, n-butyl acrylate, isobutyl acrylate, octyl acrylate, decyl acrylate, hydroxyethyl acrylate, hydroxypropyl acrylate, methyl methacrylate, ethyl methacrylate, n-butyl methacrylate, isobutyl methacrylate, octyl methacrylate, decyl methacrylate, hydroxyethyl methacrylate, hydroxypropyl methacrylate and the like and these are used singly or in combination of two or more.

Particularly, polymer particles having a core/shell structure are favorably used since they have high storage stability and their gelation rates are simply adjusted. As such polymer particles, there are exemplified, for example, substances, a core portion of which is formed from a homopolymer of alkyl acrylates, hydroxy acrylates, alkyl methacrylates or hydroxy methacrylates, a copolymer of these acrylates, or a copolymer of these acrylates with acrylic acid, methacrylic acid, maleic acid, itaconic acid or styrene and from a substance being compatible with a plasticizer and a shell portion of which is formed from a homopolymer of methyl methacrylate or a copolymer of methyl methacrylate with alkyl acrylates, hydroxy acrylates, alkyl methacrylates, hydroxy methacrylates, acrylic acid, methacrylic acid, maleic acid, itaconic acid or styrene and from a substance being incompatible with a plasticizer.

The vinyl chloride and acrylic plastisols in the present invention are preferably blended with a block type urethane resin. As the block type urethane resin, there are favorably used a urethane resin, formed by blocking a urethane resin, which is obtained by reacting polyol such as polyether polyol, polyester polyol or the like with isocyanates such as diphenylmethane diisocyanate, tolylene diisocyanate, hexamethylene diisocyanate, xylene diisocyanate, 1,3-biscyclohexane diisocyanate, tetramethylxylylene diisocyanate and m-isopropenyldimethylbenzyl diisocyanate, with a blocking agent such as oxime, amine or the like, and a compound formed by combining one or more of oxybenzoic acid esters of diisocyanate polymers or blocked alkylphenols and diisocyanate polymer forming an isocyanurate ring.

A blending ratio of the blocktype urethane resin is not specifically limited and may be appropriately determined in accordance with desired physical properties and further a variety of additives such as the above-mentioned other fillers, plasticizers and stabilizers may naturally be added.

A blending amount of the surface treated calcium carbonate of the present invention in resins is not specifically limited and may be appropriately determined depending on kinds and uses of resins, but, for example, in the case of the modified silicone, it is usually 0.01 to 300 parts by weight per 100 parts by weight of resin and preferably about 1 to about 250 parts by weight, more preferably about 5 to about 220 parts by weight, still more preferably about 10 to about 200 parts by weight. Further, for example, in the case of the plastisol, it is usually 0.01 to 300 parts by weight per 100 parts by weight of resin and preferably about 1 to about 250 parts by weight, more preferably about 5 to about 220 parts by weight, still more preferably about 10 to about 200 parts by weight.

The resin composition of the present invention provides excellent slip resistance when it is mixed in a modified silicone sealant and an acrylic plastisol resin composition.

Hereinafter, the present invention will be described in more detail by way of preparative examples and examples, but the present invention is not limited by these examples as long as it does not exceeds the gist of the present invention. And, unless otherwise stated, percentages and parts are on a weight basis in the following description.

Preparative Example 1

In 1400 kg of milk of lime adjusted to a concentration of 10% and a temperature of 12° C. was injected carbon dioxide having a concentration of 25% at a flow rate of 210 m$^3$/hr (1500 L/hr per 1 kg of calcium hydroxide) up to pH 7 to synthesize calcium carbonate. The calcium carbonate slurry was then aged for 12 hours while being stirred. A BET specific surface area of the calcium carbonate obtained was 25.0 m$^2$/g, and D50 of FRA particle size distribution of the calcium carbonate slurry was 1.78 μm. And, a good dispersion state was shown through an observation by an electron microscope.

Preparative Example 2

In 1400 kg of milk of lime adjusted to a concentration of 13% and a temperature of 12° C. was injected carbon dioxide having a concentration of 25% at a flow rate of 273 m$^3$/hr (1500 L/hr per 1 kg of calcium hydroxide) up to pH 9 to synthesize calcium carbonate. The calcium carbonate slurry was then aged for 96 hours while being stirred. A BET specific surface area of the calcium carbonate obtained was 6.5 m$^2$/g, and D50 of FRA particle size distribution of the calcium carbonate slurry was 1.42 μm. And, a good dispersion state was shown through an observation by an electron microscope.

Preparative Example 3

To 1400 kg of milk of lime adjusted to a concentration of 8% and a temperature of 12° C. was added 2.58 kg (1.7% relative to CaCO$_3$ finished, and 2.3% relative to Ca(OH)$_2$) of citric acid. In this mixture was injected carbon dioxide having a concentration of 25% at a flow rate of 168 m³/hr (1500 L/hr per 1 kg of calcium hydroxide) up to pH 7 to synthesize calcium carbonate. The calcium carbonate slurry was then adjusted to 10% in a concentration as $CaCO_3$ and aged for 48 hours while being stirred. A BET specific surface area of the calcium carbonate obtained was 40 m²/g, and D50 of FRA particle size distribution of the calcium carbonate slurry was 2.1 μm. And, a good dispersion state was shown through an observation by an electron microscope.

Preparative Example 4

To 1400 kg of milk of lime adjusted to a concentration of 8% and a temperature of 12° C. was added 4.53 kg (3.0% relative to $CaCO_3$ finished, and 4.0% relative to $Ca(OH)_2$) of citric acid. In this mixture was injected carbon dioxide having a concentration of 25% at a flow rate of 168 m³/hr (1500 L/hr per 1 kg of calcium hydroxide) up to pH 7 to synthesize calcium carbonate. The calcium carbonate solution was then adjusted to 10% in a concentration as $CaCO_3$ and aged for 72 hours while being stirred. A BET specific surface area of the calcium carbonate obtained was 55 m²/g, and D50 of FRA particle size distribution of the calcium carbonate slurry was 2.4 μm. And, a good dispersion state was shown through an observation by an electron microscope.

Preparative Example 5

In 1400 kg of milk of lime adjusted to a concentration of 13% and a temperature of 15° C. was injected carbon dioxide having a concentration of 25% at a flow rate of 1090 m³/hr (6000 L/hr per 1 kg of calcium hydroxide) up to pH 7 to synthesize calcium carbonate. The calcium carbonate solution was then aged for 3 hours while being stirred. A BET specific surface area of the calcium carbonate obtained was 25 m²/g, and D50 of FRA particle size distribution of the calcium carbonate slurry was 5.2 μm. And, many agglomerated particles were found through an observation by an electron microscope.

Preparative Example 6

In 1400 kg of milk of lime adjusted to a concentration of 13% and a temperature of 12° C. was injected carbon dioxide having a concentration of 25% at a flow rate of 546 m³/hr (3000 L/hr per 1 kg of calcium hydroxide) up to pH 7 to synthesize calcium carbonate. The calcium carbonate solution was then aged for 6 hours while being stirred. A BET specific surface area of the calcium carbonate obtained was 25 m²/g, and D50 of FRA particle size distribution of the calcium carbonate slurry was 2.9 μm. And, aggregates were found through an observation by an electron microscope.

Synthetic conditions, aging conditions and physical properties measured immediately before surface treating of the above-mentioned Preparative Examples 1 to 6 are shown in Table 1.

TABLE 1

| | | | Preparative Example 1 | Preparative Example 2 | Preparative Example 3 | Preparative Example 4 | Preparative Example 5 | Preparative Example 6 |
|---|---|---|---|---|---|---|---|---|
| Carbonation conditions | Conc. of milk of lime | % | 10 | 13 | 8 | 8 | 13 | 13 |
| | Temp. of milk of lime | ° C. | 12 | 12 | 12 | 12 | 15 | 12 |
| | Complex forming substance | | — | — | Citric acid | Citric acid | — | — |
| | Conc. of complex forming substance (to calcium carbonate) | % | — | — | 1.7 | 3 | — | — |
| | Conc. of carbon dioxide | % | 25 | 25 | 25 | 25 | 25 | 25 |
| | Flow rate of carbon dioxide (to 1 kg of calcium hydroxide) | L/hr | 1500 | 1500 | 1500 | 1500 | 6000 | 3000 |
| Aging conditions | Time of aging | hr | 12 | 96 | 48 | 72 | 3 | 6 |
| Immediately before surface ereatment | BET specific surface area | m²/g | 25 | 6.5 | 40 | 55 | 25 | 25 |
| | FRA D50 | μm | 1.78 | 1.42 | 2.1 | 2.4 | 5.2 | 2.9 |
| | Dispersion by electron microscope | | ○ | ○ | ○ | ○ | X | Δ |

Example 1

To 10 kg of calcium carbonate slurry of Preparative Example 1, which is adjusted to a concentration of 10 weight %, was added a 10% warm aqueous solution (80° C.) containing 70 g of sodium salt of a fatty acid, which has the composition of 98% C12 (lauric acid) and 2% C14 (myristic acid), and the mixture was stirred for one hour. After stirring, the mixture was dehydrated to a solid content of 60% and dried at 105° C. for 6 hours, and then the solid matter was powdered with a hammer mill.

Example 2

To 10 kg of calcium carbonate slurry of Preparative Example 1, which is adjusted to a concentration of 10 weight %, was added a 10% warm aqueous solution (80° C.) containing 70 g of sodium salt of a fatty acid, which has the composition of 50% C12 (lauric acid) and 50% C14 (a myristic acid), and the mixture was stirred for one hour. After stirring, the mixture was dehydrated to a solid content of 60% and dried at 105° C. for 6 hours, and then the solid matter was powdered with a hammer mill.

Example 3

To 10 kg of calcium carbonate slurry of Preparative Example 1, which is adjusted to a concentration of 10 weight %, was added a 10% warm aqueous solution (80° C.) containing 70 g of sodium salt of a fatty acid, which has the composition of 50% C12 (lauric acid), 38% C14 (myristic acid) and 12% C16 (palmitic acid), and the mixture was stirred for one hour. After stirring, the mixture was dehydrated to a solid content of 60% and dried at 105° C. for 6 hours, and then the solid matter was powdered with a hammer mill.

Example 4

To 10 kg of calcium carbonate slurry of Preparative Example 1, which is adjusted to a concentration of 10 weight %, was added a 10% warm aqueous solution (80° C.) containing 70 g of sodium salt of a fatty acid, which has the composition of 2% C12 (lauric acid), 96% C14 (myristic acid) and 2% C16 (palmitic acid), and the mixture was stirred for one hour. After stirring, the mixture was dehydrated to a solid content of 60% and dried at 105° C. for 6 hours, and then the solid matter was powdered with a hammer mill.

Example 5

To 10 kg of calcium carbonate slurry of Preparative Example 1, which is adjusted to a concentration of 10 weight %, was added a 10% warm aqueous solution (80° C.) containing 70 g of sodium salt of a fatty acid, which has the composition of 83% C12 (lauric acid) and 17% C14 (myristic acid), and the mixture was stirred for one hour. After stirring, the mixture was dehydrated to a solid content of 60% and dried at 105° C. for 6 hours, and then the solid matter was powdered with a hammer mill.

Example 6

To 10 kg of calcium carbonate slurry of Preparative Example 1, which is adjusted to a concentration of 10 weight %, was added a 10% warm aqueous solution (80° C.) containing 70 g of sodium salt of a fatty acid, which has the composition of 93% C12 (lauric acid) and 7% C14 (myristic acid), and the mixture was stirred for one hour. After stirring, the mixture was dehydrated to a solid content of 60% and dried at 105° C. for 6 hours, and then the solid matter was powdered with a hammer mill.

Example 7

To 10 kg of calcium carbonate slurry of Preparative Example 1, which is adjusted to a concentration of 10 weight %, was added a 10% warm aqueous solution (80° C.) containing 70 g of sodium salt of a fatty acid, which has the composition of 73% C12 (lauric acid), 15% C14 (myristic acid) and 12% C16 (palmitic acid), and the mixture was stirred for one hour. After stirring, the mixture was dehydrated to a solid content of 60% and dried at 105° C. for 6 hours, and then the solid matter was powdered with a hammer mill.

Example 8

To 10 kg of calcium carbonate slurry of Preparative Example 1, which is adjusted to a concentration of 10 weight %, was added a 10% warm aqueous solution (80° C.) containing 70 g of sodium salt of a fatty acid, which has the composition of 82% C12 (lauric acid), 6% C14 (myristic acid) and 12% C16 (palmitic acid), and the mixture was stirred for one hour. After stirring, the mixture was dehydrated to a solid content of 60% and dried at 105° C. for 6 hours, and then the solid matter was powdered with a hammer mill.

Example 9

To 10 kg of calcium carbonate slurry of Preparative Example 1, which is adjusted to a concentration of 10 weight %, was added a 10% warm aqueous solution (80° C.) containing 70 g of sodium salt of a fatty acid, which has the composition of 86% C12 (lauric acid), 2% C14 (myristic acid) and 12% C16 (palmitic acid), and the mixture was stirred for one hour. After stirring, the mixture was dehydrated to a solid content of 60% and dried at 105° C. for 6 hours, and then the solid matter was powdered with a hammer mill.

Example 10

To 10 kg of calcium carbonate slurry of Preparative Example 1, which is adjusted to a concentration of 10 weight %, was added a 10% warm aqueous solution (80° C.) containing 70 g of sodium salt of a fatty acid, which has the composition of 98% C12 (lauric acid) and 2% C14 (myristic acid), and the mixture was stirred for one hour. After stirring, the mixture was dehydrated to a solid content of 60% and dried at 85° C. for 30 hours, and then the solid matter was powdered with a hammer mill.

Example 11

To 10 kg of calcium carbonate slurry of Preparative Example 1, which is adjusted to a concentration of 10 weight %, was added a 10% warm aqueous solution (80° C.) containing 70 g of sodium salt of a fatty acid, which has the composition of 98% C12 (lauric acid) and 2% C14 (myristic acid), and the mixture was stirred for one hour. After stirring, the mixture was dehydrated to a solid content of 60% and dried at 95° C. for 15 hours, and then the solid matter was powdered with a hammer mill.

Example 12

To 10 kg of calcium carbonate slurry of Preparative Example 1, which is adjusted to a concentration of 10 weight %, was added a 10% warm aqueous solution (80° C.) containing 75 g of potassium salt of a fatty acid, which has the composition of 98% C12 (lauric acid) and 2% C14 (myristic acid), and the mixture was stirred for one hour. After stirring, the mixture was dehydrated to a solid content of 60% and dried at 105° C. for 6 hours, and then the solid matter was powdered with a hammer mill.

Example 13

To 10 kg of calcium carbonate slurry of Preparative Example 1, which is adjusted to a concentration of 10 weight %, was added a 10% warm suspension (80° C.) containing 49 g of sodium salt of a fatty acid, having the composition of 98% C12 (lauric acid) and 2% C14 (myristic acid), and 19 g of a fatty acid, having the composition of 98% C12 (lauric acid) and 2% C14 (a myristic acid), and the mixture was stirred for one hour. After stirring, the mixture was dehydrated to a solid content of 60% and dried at 105° C. for 6 hours, and then the solid matter was powdered with a hammer mill.

Example 14

To 10 kg of calcium carbonate slurry of Preparative Example 1, which is adjusted to a concentration of 10 weight %, was added a 10% warm aqueous solution (80° C.) containing 21 g of sodium salt of a fatty acid, having the composition of 98% C12 (lauric acid) and 2% C14 (myristic acid), and 44 g of a fatty acid, having the composition of 98% C12 (lauric acid) and 2% C14 (a myristic acid), and the mixture was stirred for one hour. After stirring, the mixture was dehydrated to a solid content of 60% and dried at 105° C. for 6 hours, and then the solid matter was powdered with a hammer mill.

Example 15

To 10 kg of calcium carbonate slurry of Preparative Example 1, which is adjusted to a concentration of 10 weight %, was added a 10% warm suspension (80° C.) containing 63 g of a fatty acid, having the composition of 98% C12 (lauric acid) and 2% C14 (myristic acid), and the mixture was stirred for one hour. After stirring, the mixture was dehydrated to a solid content of 60% and dried at 105° C. for 6 hours, and then the solid matter was powdered with a hammer mill.

Example 16

To 10 kg of calcium carbonate slurry of Preparative Example 2, which is adjusted to a concentration of 10 weight %, was added a 10% warm aqueous solution (80° C.) containing 17 g of sodium salt of a fatty acid, having the composition of 98% C12 (lauric acid) and 2% C14 (myristic acid), and the mixture was stirred for one hour. After stirring, the mixture was dehydrated to a solid content of 60% and dried at 105° C. for 6 hours, and then the solid matter was powdered with a hammer mill.

Example 17

To 10 kg of calcium carbonate slurry of Preparative Example 3, which is adjusted to a concentration of 10 weight %, was added a 10% warm aqueous solution (80° C.) containing 120 g of sodium salt of a fatty acid, having the composition of 98% C12 (lauric acid) and 2% C14 (myristic acid), and the mixture was stirred for one hour. After stirring, the mixture was dehydrated to a solid content of 60% and dried at 105° C. for 6 hours, and then the solid matter was powdered with a hammer mill.

Example 18

To 10 kg of calcium carbonate slurry of Preparative Example 4, which is adjusted to a concentration of 10 weight %, was added a 10% warm aqueous solution (80° C.) containing 160 g of sodium salt of a fatty acid, having the composition of 98% C12 (lauric acid) and 2% C14 (myristic acid), and the mixture was stirred for one hour. After stirring, the mixture was dehydrated to a solid content of 60% and dried at 105° C. for 6 hours, and then the solid matter was powdered with a hammer mill.

Example 19

To 10 kg of calcium carbonate slurry of Preparative Example 1, which is adjusted to a concentration of 10 weight %, was added a 10% warm aqueous solution (80° C.) containing 35 g of sodium salt of a fatty acid, having the composition of 98% C12 (lauric acid) and 2% C14 (myristic acid), and the mixture was stirred for one hour. After stirring, the mixture was dehydrated to a solid content of 60% and dried at 105° C. for 6 hours, and then the solid matter was powdered with a hammer mill.

Example 20

To 10 kg of calcium carbonate slurry of Preparative Example 1, which is adjusted to a concentration of 10 weight %, was added a 10% warm aqueous solution (80° C.) containing 50 g of sodium salt of a fatty acid, having the composition of 98% C12 (lauric acid) and 2% C14 (myristic acid), and the mixture was stirred for one hour. After stirring, the mixture was dehydrated to a solid content of 60% and dried at 105° C. for 6 hours, and then the solid matter was powdered with a hammer mill.

Example 21

To 10 kg of calcium carbonate slurry of Preparative Example 1, which is adjusted to a concentration of 10 weight %, was added a 10% warm aqueous solution (80° C.) containing 100 g of sodium salt of a fatty acid, having the composition of 98% C12 (lauric acid) and 2% C14 (myristic acid), and the mixture was stirred for one hour. After stirring, the mixture was dehydrated to a solid content of 60% and dried at 105° C. for 6 hours, and then the solid matter was powdered with a hammer mill.

Example 22

To 10 kg of calcium carbonate slurry of Preparative Example 1, which is adjusted to a concentration of 10 weight %, was added a 10% warm aqueous solution (80° C.) containing 130 g of sodium salt of a fatty acid, having the composition of 98% C12 (lauric acid) and 2% C14 (myristic acid), and the mixture was stirred for one hour. After stirring, the mixture was dehydrated to a solid content of 60% and dried at 105° C. for 6 hours, and then the solid matter was powdered with a hammer mill.

Example 23

To 10 kg of calcium carbonate slurry of Preparative Example 5, which is adjusted to a concentration of 10 weight %, was added a 10% warm aqueous solution (80° C.) containing 70 g of sodium salt of a fatty acid, having the composition of 98% C12 (lauric acid) and 2% C14 (myristic acid), and the mixture was stirred for one hour. After stirring, the mixture was dehydrated to a solid content of 60% and dried at 105° C. for 6 hours, and then the solid matter was powdered with a hammer mill.

Example 24

To 10 kg of calcium carbonate slurry of Preparative Example 6, which is adjusted to a concentration of 10 weight %, was added a 10% warm aqueous solution (80° C.) containing 70 g of sodium salt of a fatty acid, having the composition of 98% C12 (lauric acid) and 2% C14 (myristic acid), and the mixture was stirred for one hour. After stirring, the mixture was dehydrated to a solid content of 60% and dried at 105° C. for 6 hours, and then the solid matter was powdered with a hammer mill.

Comparative Example 1

To 10 kg of calcium carbonate slurry of Preparative Example 1, which is adjusted to a concentration of 10 weight %, was added a 10% warm aqueous solution (80° C.) containing 70 g of sodium salt of a fatty acid (trade name: Nonsoul SN-1, produced by NOF CORPORATION), which has the composition of 2% C12 (lauric acid), 4% C14 (myristic acid), 28% C16 (palmitic acid) and 66% C18 (stearic acid), and the mixture was stirred for one hour. After stirring, the mixture was dehydrated to a solid content of 60% and dried at 105° C. for 6 hours, and then the solid matter was powdered with a hammer mill.

Comparative Example 2

To 10 kg of calcium carbonate slurry of Preparative Example 1, which is adjusted to a concentration of 10 weight %, was added a 10% warm aqueous solution (80° C.) containing 70 g of potassium salt of a fatty acid (trade name: Nonsolul PK-1, produced by NOF CORPORATION), having the composition of 0.5% C12 (lauric acid), 0.4% C14 (myristic acid), 97.5% C16 (palmitic acid) and 1.6% C18 (stearic acid), and the mixture was stirred for one hour. After stirring, the mixture was dehydrated to a solid content of 60% and dried at 105° C. for 6 hours, and then the solid matter was powdered with a hammer mill.

Comparative Example 3

To 10 kg of calcium carbonate slurry of Preparative Example 1, which is adjusted to a concentration of 10 weight %, was added a 10% warm aqueous solution (80° C.) containing 70 g of sodium salt of a fatty acid (trade name: Marseilles Soap, produced by NOF CORPORATION), having the composition of 3% C12 (lauric acid), 4% C14 (myristic acid), 25% C16 (palmitic acid), 18% C18 (stearic acid), 45% C18F1 (oleic acid) and 5% C18F2 (linoleic acid) and the mixture was stirred for one hour. After stirring, the mixture was dehydrated to a solid content of 60% and dried at 105° C. for 6 hours, and then the solid matter was powdered with a hammer mill.

Comparative Example 4

To 10 kg of calcium carbonate slurry of Preparative Example 1, which is adjusted to a concentration of 10 weight %, was added a 10% warm aqueous solution (80° C.) containing 70 g of sodium salt of a fatty acid (trade name: Nonsoul LN-1, produced by NOF CORPORATION), having the composition of 7% C8 (caprylic acid), 6% C10 (capric acid), 61% C12 (lauric acid), 19% C14 (myristic acid) and 7% C16 (palmitic acid), and the mixture was stirred for one hour. After stirring, the mixture was dehydrated to a solid content of 60% and dried at 105° C. for 6 hours, and then the solid matter was powdered with a hammer mill.

Comparative Example 5

To 10 kg of calcium carbonate slurry of Preparative Example 1, which is adjusted to a concentration of 10 weight %, was added a 10% warm aqueous solution (80° C.) containing 70 g of sodium salt of a fatty acid, having the composition of 98% C12 (lauric acid) and 2% C14 (myristic acid), and the mixture was stirred for one hour. After stirring, the mixture was dehydrated to a solid content of 60% and dried at 40° C. for 96 hours, and then the solid matter was powdered with a hammer mill.

Comparative Example 6

To 10 kg of calcium carbonate slurry of Preparative Example 1, which is adjusted to a concentration of 10 weight %, was added a 10% warm aqueous solution (80° C.) containing 70 g of sodium salt of a fatty acid, having the composition of 98% C12 (lauric acid) and 2% C14 (myristic acid), and the mixture was stirred for one hour. After stirring, the mixture was dehydrated to a solid content of 60% and dried in a flash drier, of which an inlet temperature and an outlet temperature are controlled to 250° C. and 105° C., respectively. A residence time in the drier was approximately 1 to 60 seconds. Then, the solid matter was powdered with a hammer mill.

Characteristics and physical properties of the surface treated calcium carbonates obtained in the above-mentioned Examples 1 to 24 and Comparative Examples 1 to 6 are shown in Tables 2 and 3.

TABLE 2

| | | Unit | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Number of carbon atoms | C8 | % | 0 | 0 | 0 | 0 | 0 | 0 | 0 | 0 |
| | C10 | % | 0 | 0 | 0 | 0 | 0 | 0 | 0 | 0 |
| | C12 | % | 98 | 50 | 50 | 2 | 83 | 93 | 73 | 82 |
| | C14 | % | 2 | 50 | 38 | 96 | 17 | 7 | 15 | 6 |
| | C16 | % | 0 | 0 | 12 | 2 | 0 | 0 | 12 | 12 |
| | C18 | % | 0 | 0 | 0 | 0 | 0 | 0 | 0 | 0 |
| | C18F1 | % | 0 | 0 | 0 | 0 | 0 | 0 | 0 | 0 |
| | C18F2 | % | 0 | 0 | 0 | 0 | 0 | 0 | 0 | 0 |
| (C12 + C14) | | % | 100 | 100 | 88 | 98 | 100 | 100 | 88 | 88 |
| [C12/(C12 + C14)] × 100 | | % | 98 | 50 | 57 | 2 | 83 | 93 | 83 | 93 |
| Pv | | % | 45 | 46 | 48 | 44 | 45 | 48 | 50 | 44 |
| Preparative Examples of calcium carbonate slurry | | | Pre. Ex. 1 | Pre. Ex. 1 | Pre. Ex. 1 | Pre. Ex. 1 | Pre. Ex. 1 | Pre. Ex. 1 | Pre. Ex. 1 | Pre. Ex. 1 |
| Sw | | m$^2$/g | 23.2 | 23.2 | 23.3 | 23 | 23.1 | 23.5 | 23 | 23.2 |
| As | | mg/m$^2$ | 2.46 | 2.46 | 2.4 | 2.48 | 2.51 | 2.43 | 2.43 | 2.41 |
| Dxp | | μm | 0.03 | 0.029 | 0.03 | 0.028 | 0.03 | 0.029 | 0.03 | 0.031 |
| Dyp/Dxp | | | 65 | 63 | 59 | 62 | 60 | 66 | 63 | 62 |
| D50 | | μm | 1.78 | 1.78 | 1.78 | 1.78 | 1.78 | 1.78 | 1.78 | 1.78 |

| | | | Ex. 9 | Ex. 10 | Ex. 11 | Ex. 112 | Ex. 13 | Ex. 14 | Ex. 15 |
|---|---|---|---|---|---|---|---|---|---|
| Number of carbon atoms | C8 | | 0 | 0 | 0 | 0 | 0 | 0 | 0 |
| | C10 | | 0 | 0 | 0 | 0 | 0 | 0 | 0 |
| | C12 | | 86 | 98 | 98 | 98 | 98 | 98 | 98 |
| | C14 | | 2 | 2 | 2 | 2 | 2 | 2 | 2 |
| | C16 | | 12 | 0 | 0 | 0 | 0 | 0 | 0 |

TABLE 2-continued

|  | | | | | | | |
|---|---|---|---|---|---|---|---|
| C18 | 0 | 0 | 0 | 0 | 0 | 0 | 0 |
| C18F1 | 0 | 0 | 0 | 0 | 0 | 0 | 0 |
| C18F2 | 0 | 0 | 0 | 0 | 0 | 0 | 0 |
| (C12 + C14) | 88 | 100 | 100 | 100 | 100 | 100 | 100 |
| [C12/(C12 + C14)] × 100 | 98 | 98 | 98 | 98 | 98 | 98 | 98 |
| Pv | 46 | 85 | 75 | 45 | 61 | 73 | 86 |
| Preparative Examples of calcium carbonate slurry | Pre. Ex. 1 | Pre. Ex. 1 | Pre. Ex. 1 | Pre. Ex. 1 | Pre. Ex. 1 | Pre. Ex. 1 | Pre. Ex. 1 |
| Sw | 23.2 | 23.6 | 23.2 | 23.3 | 23.4 | 23.5 | 23.6 |
| As | 2.41 | 2.42 | 2.5 | 2.45 | 2.48 | 2.47 | 2.42 |
| Dxp | 0.03 | 0.029 | 0.029 | 0.03 | 0.031 | 0.033 | 0.035 |
| Dyp/Dxp | 62 | 64 | 64 | 64 | 47 | 36 | 28 |
| D50 | 1.78 | 1.78 | 1.78 | 1.78 | 1.78 | 1.78 | 1.78 |

TABLE 3

|  |  | Unit | Ex. 16 | Ex. 17 | Ex. 18 | Ex. 19 | Ex. 20 | Ex. 21 | Ex. 22 |
|---|---|---|---|---|---|---|---|---|---|
| Number of carbon atoms | C8 | % | 0 | 0 | 0 | 0 | 0 | 0 | 0 |
|  | C10 | % | 0 | 0 | 0 | 0 | 0 | 0 | 0 |
|  | C12 | % | 98 | 98 | 98 | 98 | 98 | 98 | 98 |
|  | C14 | % | 2 | 2 | 2 | 2 | 2 | 2 | 2 |
|  | C16 | % | 0 | 0 | 0 | 0 | 0 | 0 | 0 |
|  | C18 | % | 0 | 0 | 0 | 0 | 0 | 0 | 0 |
|  | C18F1 | % | 0 | 0 | 0 | 0 | 0 | 0 | 0 |
|  | C18F2 | % | 0 | 0 | 0 | 0 | 0 | 0 | 0 |
| (C12 + C14) |  | % | 100 | 100 | 100 | 100 | 100 | 100 | 100 |
| [C12/(C12 + C14)] × 100 |  | % | 98 | 98 | 98 | 98 | 98 | 98 | 98 |
| Pv |  | % | 62 | 43 | 33 | 72 | 58 | 39 | 21 |
| Preparative Examples of calcium carbonate slurry |  |  | Pre. Ex. 2 | Pre. Ex. 3 | Pre. Ex. 4 | Pre. Ex. 1 | Pre. Ex. 1 | Pre. Ex. 1 | Pre. Ex. 1 |
| Sw |  | m$^2$/g | 6 | 33.3 | 45.2 | 23 | 23.3 | 22.9 | 23.5 |
| As |  | mg/m$^2$ | 2.5 | 2.73 | 2.65 | 1.35 | 1.8 | 3.54 | 4.34 |
| Dxp |  | μm | 0.17 | 0.015 | 0.012 | 0.04 | 0.038 | 0.028 | 0.026 |
| Dyp/Dxp |  |  | 18 | 112 | 125 | 20 | 45 | 72 | 84 |
| D50 |  | μm | 1.42 | 2.1 | 2.4 | 1.78 | 1.78 | 1.78 | 1.78 |

|  |  | Ex. 23 | Ex. 24 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|
| Number of carbon atoms | C8 | 0 | 0 | 0 | 0 | 0 | 7 | 0 | 0 |
|  | C10 | 0 | 0 | 0 | 0 | 0 | 6 | 0 | 0 |
|  | C12 | 98 | 98 | 2 | 0.5 | 3 | 61 | 98 | 98 |
|  | C14 | 2 | 2 | 4 | 0.4 | 4 | 19 | 2 | 2 |
|  | C16 | 0 | 0 | 28 | 97.5 | 25 | 7 | 0 | 0 |
|  | C18 | 0 | 0 | 66 | 1.6 | 18 | 0 | 0 | 0 |
|  | C18F1 | 0 | 0 | 0 | 0 | 45 | 0 | 0 | 0 |
|  | C18F2 | 0 | 0 | 0 | 0 | 5 | 0 | 0 | 0 |
| (C12 + C14) |  | 100 | 100 | 6 | 2 | 7 | 80 | 100 | 100 |
| [C12/(C12 + C14)] × 100 |  | 98 | 98 | — | — | — | — | 98 | 98 |
| Pv |  | 74 | 68 | 32 | 46 | 8 | 33 | 99 | 95 |
| Preparative Examples of calcium carbonate slurry |  | Pre. Ex. 5 | Pre. Ex. 6 | Pre. Ex. 1 | Pre. Ex. 1 | Pre. Ex. 1 | Pre. Ex. 1 | Pre. Ex. 1 | Pre. Ex. 1 |
| Sw |  | 23.4 | 23 | 23.2 | 23.3 | 23 | 23.4 | 23.1 | 23 |
| As |  | 2.39 | 2.47 | 2.5 | 2.45 | 2.48 | 2.48 | 2.47 | 2.43 |
| Dxp |  | 0.042 | 0.038 | 0.029 | 0.03 | 0.029 | 0.03 | 0.032 | 0.033 |
| Dyp/Dxp |  | 9 | 25 | 62 | 68 | 64 | 65 | 63 | 64 |
| D50 |  | 5.2 | 2.9 | 1.78 | 1.78 | 1.78 | 1.78 | 1.78 | 1.78 |

Examples 25 to 48 and Comparative Examples 7 to 12

By using the surface treated calcium carbonates of the Examples 1 to 24 and Comparative Examples 1 to 6 as a filler and by kneading resins with the fillers in the following formulation, resin compositions were obtained. And, tests were conducted on these resin compositions following the procedures described below and performances were evaluated. By the way, parts means parts by weight.

(Formulation)

Base materials:

| | |
|---|---|
| resin (MS Polymer S810 produced by KANEKA CORPORATION) | 500 parts |
| DOP | 400 parts |
| heavy calcium carbonate (Super S produced by Maruo Calcium Co., Ltd.) | 150 parts |

-continued

| | |
|---|---|
| amimosilane | 5 parts |
| filler | 600 parts |
| Curing agent: | |
| colloidal calcium carbonate (KALFAIN 200M produced by Maruo Calcium Co., Ltd.) | 200 parts |
| tin octylate | 60 parts |
| laurylamine | 10 parts |
| DOP | 110 parts |
| heavy calcium carbonate (Super SSS produced by Maruo Calcium Co., Ltd.) | 280 parts |

The base materials and the curing agent were prepared by adequately kneading each mixture until grains disappeared with 5L VERSATILE MIXER (manufactured by DALTON CORPORATION).

<Viscosity>

The viscosities of the base materials of the above-mentioned cured resin composition at 10 rpm were measured using a BS type viscometer. Results of measurements are shown in Table 4.

<Slip Resistance and Slump Resistance>

The mixture of each base material and the curing agent, mixed at a ratio of ten to ones, was adequately deaerated and blended and then drawn in a length of 50 mm on a tinplate having a sufficient polishing finish using a semicircular beat plate with a diameter of 15 mm, and the tinplate was left standing at 50° C. for 24 hours with the tinplate propped vertically.

The slip resistance was represented by a distance (mm) to the position of an upper end of a sample sagged after left standing relative to the position of an upper end of the sample applied first before left standing. The smaller the value of this distance, the better the slip resistance.

The slump resistance was represented by an increment ratio of a length of a sample due to sagging relative to an initial length of 50 mm and evaluated according to the following criteria. Results of measurements and evaluations are shown in Table 4.

(Criteria on Slump Resistance)

A: increment ratio is 0% or larger and smaller than 5%

B: increment ratio is 5% or larger and smaller than 10%

C: increment ratio is 10% or larger and smaller than 20%

D: increment ratio is 20% or larger

TABLE 4

| | Kind of filler used | Viscosity of base materials 10 rpm Pa · s | Slip resistance mm | Slump resistance |
|---|---|---|---|---|
| Example 25 | Example 1 | 682 | 0.1 | A |
| Example 26 | Example 2 | 630 | 3.4 | A |
| Example 27 | Example 3 | 561 | 4.8 | B |
| Example 28 | Example 4 | 545 | 4.2 | B |
| Example 29 | Example 5 | 620 | 0.8 | A |
| Example 30 | Example 6 | 672 | 0.4 | A |
| Example 31 | Example 7 | 608 | 2 | A |
| Example 32 | Example 8 | 670 | 1.6 | A |
| Example 33 | Example 9 | 683 | 0.9 | A |
| Example 34 | Example 10 | 520 | 5.2 | B |
| Example 35 | Example 11 | 570 | 4.2 | B |

TABLE 4-continued

| | Kind of filler used | Viscosity of base materials 10 rpm Pa · s | Slip resistance mm | Slump resistance |
|---|---|---|---|---|
| Example 36 | Example 12 | 690 | 0.1 | A |
| Example 37 | Example 13 | 640 | 2.2 | A |
| Example 38 | Example 14 | 630 | 3.6 | A |
| Example 39 | Example 15 | 622 | 5.4 | A |
| Example 40 | Example 16 | 380 | 0.9 | C |
| Example 41 | Example 17 | 920 | 1 | A |
| Example 42 | Example 18 | 1130 | 0.6 | A |
| Example 43 | Example 19 | 302 | 3.7 | C |
| Example 44 | Example 20 | 543 | 0.8 | B |
| Example 45 | Example 21 | 838 | 1.9 | A |
| Example 46 | Example 22 | 1180 | 3.8 | A |
| Example 47 | Example 23 | 230 | 4.1 | D |
| Example 48 | Example 24 | 440 | 3.2 | C |
| Comp. Ex. 7 | Comp. Ex. 1 | 565 | 14.5 | B |
| Comp. Ex. 8 | Comp. Ex. 2 | 703 | 12.4 | A |
| Comp. Ex. 9 | Comp. Ex. 3 | 360 | 20.9 | C |
| Comp. Ex. 10 | Comp. Ex. 4 | 532 | 9.7 | B |
| Comp. Ex. 11 | Comp. Ex. 5 | 430 | 12.6 | C |
| Comp. Ex. 12 | Comp. Ex. 6 | 442 | 12.8 | C |

Examples 49 to 72 and Comparative Examples 13 to 18

By using the surface treated calcium carbonates of the Examples 1 to 24 and Comparative Examples 1 to 6 as a filler and by kneading resins with the fillers in the following formulation, resin compositions were obtained. And, tests were conducted on these resin compositions following the procedures described below and performances were evaluated. By the way, parts means parts by weight.

| (Formulation) | |
|---|---|
| acrylic resin ZEON ACRYLIC RESIN F345 (produced by Shin Dai-Ichi Enbi Corporation) | 250 parts |
| urethane block polymer (produced by MITSUI TAKEDA CHEMICALS, INC.) | 120 parts |
| urethane curing agent (produced by MITSUI TAKEDA CHEMICALS, INC.) | 7 parts |
| DINP | 500 parts |
| terpene | 75 parts |
| filler | 275 parts |

Acrylic sols were prepared by adjusting each mixture to room temperature and by kneading it until grains disappeared with 5L VERSATILE MIXER (manufactured by DALTON CORPORATION).

<Viscosity>

The viscosities of the acrylic sols prepared based on the above-mentioned formulation at 20 rpm were measured using a BH type viscometer. Results of measurements are shown in Table 5.

<Slip Resistance and Slump Resistance>

Each of the above-mentioned acrylic sols was adequately deaerated and blended and then drawn in a length of 50 mm on an electrodeposition coated plate having a sufficient polishing finish using a semicircular beat plate with a diameter of 10 mm, and this plate was left standing at 100° C. for 10 minutes with the plate propped vertically.

The slip resistance was represented by a distance (mm) to the position of an upper end of a sample sagged after left standing relative to the position of an upper end of the sample applied first before left standing. The smaller the value of this distance, the better the slip resistance.

The slump resistance was represented by an increment ratio of a length of a sample due to sagging relative to an initial length of 50 mm and evaluated according to the following criteria. Results of measurements and evaluations are shown in Table 5.

(Criteria on Slump Resistance)

A: increment ratio is 0% or larger and smaller than 10%

B: increment ratio is 10% or larger and smaller than 20%

C: increment ratio is 20% or larger and smaller than 40%

D: increment ratio is 40% or larger

TABLE 5

|  | Kind of filler used | Viscosity of acrylic sols 20 rpm Pa·s | Slip resistance mm | Slump resistance |
|---|---|---|---|---|
| Example 49 | Example 1 | 134 | 0 | A |
| Example 50 | Example 2 | 120 | 8.2 | A |
| Example 51 | Example 3 | 102 | 9.8 | B |
| Example 52 | Example 4 | 100 | 7.6 | B |
| Example 53 | Example 5 | 119 | 2.2 | A |
| Example 54 | Example 6 | 139 | 0.9 | A |
| Example 55 | Example 7 | 122 | 3.3 | A |
| Example 56 | Example 8 | 138 | 2.9 | A |
| Example 57 | Example 9 | 135 | 1.2 | A |
| Example 58 | Example 10 | 91 | 9.2 | B |
| Example 59 | Example 11 | 98 | 5.5 | B |
| Example 60 | Example 12 | 136 | 0 | A |
| Example 61 | Example 13 | 118 | 3.9 | A |
| Example 62 | Example 14 | 117 | 6 | A |
| Example 63 | Example 15 | 116 | 9.4 | A |
| Example 64 | Example 16 | 48 | 2 | C |
| Example 65 | Example 17 | 167 | 1.8 | A |
| Example 66 | Example 18 | 195 | 1.2 | A |
| Example 67 | Example 19 | 57 | 7.9 | C |
| Example 68 | Example 20 | 99 | 1.1 | B |
| Example 69 | Example 21 | 158 | 0.9 | A |
| Example 70 | Example 22 | 199 | 7.8 | A |
| Example 71 | Example 23 | 32 | 8.9 | D |
| Example 72 | Example 24 | 78 | 7.6 | C |
| Comp. Ex. 13 | Comp. Ex. 1 | 106 | 27.6 | B |
| Comp. Ex. 14 | Comp. Ex. 2 | 140 | 24.8 | A |
| Comp. Ex. 15 | Comp. Ex. 3 | 71 | 30.2 | C |
| Comp. Ex. 16 | Comp. Ex. 4 | 103 | 15.8 | B |
| Comp. Ex. 17 | Comp. Ex. 5 | 78 | 22.2 | C |
| Comp. Ex. 18 | Comp. Ex. 6 | 79 | 21.1 | C |

INDUSTRIAL APPLICABILITY

As described above, the surface treated calcium carbonate of the present invention can provide the resin compositions having slip resistance and slump resistance with a good balance between them, especially the resin compositions having an excellent slip resistance.

What is claimed is:

1. A surface treated calcium carbonate for use in a curable resin in which calcium carbonate is surface treated with a surface treatment composition comprising at least one selected from the group consisting of a fatty acid having an alkyl group of 12 carbon atoms and a fatty acid having an alkyl group of 14 carbon atoms;

wherein the sum of the weight of fatty acids having an alkyl group of 12 carbon atoms and the weight of fatty acids having an alkyl group of 14 carbon atoms is 85% or more of the total weight of fatty acids in the surface treatment composition; and wherein the surface treated calcium carbonate satisfies $Pv \leq 90(\%)$ and is dried using a drier having a sufficient residence time to supply heat quantity such that the fatty acid surface treatment composition penetrates into secondary agglomerated particles of calcium carbonate;

wherein Pv is a parameter representing a state of being treated with a surface treatment composition, Pv being a ratio of a volume (vol. %) precipitated in hexane to a total volume 100 ml of hexane and surface treated calcium carbonate, Pv being determined by:

charging hexane and the surface treated calcium carbonate in a ratio of 100 g/10 g into a container, shaking the content of the bottle at a shaking frequency of 300 times per minute for 10 minutes using a shaker, transferring the resulting shaken mixture into a 100 ml measuring cylinder up to 100 ml, and allowing the resulting shaken mixture to stand at 23° C. for 24 hours during which the mixture separates into a hexane layer and a precipitated layer, measuring a volume of the precipitated layer, and, determining a ratio of the measured volume of the precipitated layer to a total volume 100 ml of hexane and surface treated calcium carbonate.

2. The surface treated calcium carbonate for use in a curable resin according to claim 1, wherein the sum of the weight of fatty acids having an alkyl group of 12 carbon atoms and the weight of fatty acids having an alkyl group of 14 carbon atoms is 95% or more of the total of fatty acids in the surface treatment composition.

3. The surface treated calcium carbonate for use in a curable resin according to claim 1 or 2, wherein the surface treatment composition further satisfies the following equation (c):

$$[C12/(C12+C14)] \times 100 \geq 80(\%), \quad (c)$$

wherein C12 is the weight of fatty acids having an alkyl group of 12 carbon atoms and C14 is the weight of fatty acids having an alkyl group of 14 carbon atoms, in the surface treatment composition.

4. The surface treated calcium carbonate for use in a curable resin according to claim 3, wherein the surface treatment composition further satisfies the following equation (d):

$$[C12/(C12+C14)] \times 100 \geq 90(\%). \quad (d)$$

5. The surface treated calcium carbonate for use in a curable resin according to claim 3, wherein the surface treatment composition further satisfies the following equation (e):

$$[C12/(C12+C14)] \times 100 \geq 95(\%). \quad (e)$$

6. The surface treated calcium carbonate for use in a curable resin according to claim 1 or 2 wherein the surface treated calcium carbonate satisfies $Pv \leq 80(\%)$.

7. The surface treated calcium carbonate for use in a curable resin according to claim 1 or 2, wherein the surface treated calcium carbonate satisfies $Pv \leq 70(\%)$.

8. The surface treated calcium carbonate for use in a curable resin according to claim 1 or 2, wherein the fatty acids in the surface treatment composition are in the form of fatty acid salts.

9. A curable resin composition comprising blending a curable resin with the surface treated calcium carbonate according to claim 1 or 2.

10. The curable resin composition according to claim 9, wherein the curable resin is a modified silicone.

11. The curable resin composition according to claim 9, wherein the curable resin is a plastisol.

12. The curable resin composition according to claim 11, wherein the plastisol is an acrylic plastisol.

13. A surface treated calcium carbonate for use in curable resin in which calcium carbonate is surface treated with a surface treatment composition comprising at least one selected from the group consisting of a fatty acid having an alkyl group of 12 carbon atoms and a fatty acid having an alkyl group of 14 carbon atoms;

wherein the sum of the weight of fatty acids having an alkyl group of 12 carbon atoms and the weight of fatty acids having an alkyl group of 14 carbon atoms is 85% or more of the total weight of fatty acids in the surface treatment composition;

wherein the surface treated calcium carbonate satisfies $Pv \leq 90(\%)$ and is dried using a drier having a sufficient residence time to supply heat quantity such that the fatty acid surface treatment composition penetrates into secondary agglomerated particles of calcium carbonate;

the surface treated calcium carbonate satisfying $1.0 \leq As \leq 6.0$ (mg/M$^2$); and the surface treated calcium carbonate satisfying $2 \leq BET \leq 70$ (m$^2$/g);

wherein As is an amount of the surface treatment composition used for surface treatment of calcium carbonate per a unit surface area of calcium carbonate (mg/M$^2$);

BET represents a specific surface area (m$^2$/g) of the surface treated calcium carbonate; and Pv is a parameter representing a state of being treated with a surface treatment composition, Pv being a ratio of a volume (vol. %) precipitated in hexane to a total volume 100 ml of hexane and surface treated calcium carbonate; Pv being determined by:

charging hexane and the surface treated calcium carbonate in a ratio of 100 g/10 g into a container, shaking the content of the bottle at a shaking frequency of 300 times per minute for 10 minutes using a shaker, transferring the resulting shaken mixture into a 100 ml measuring cylinder up to 100 ml, and allowing the resulting shaken mixture to stand at 23° C. for 24 hours during which the mixture separates into a hexane layer and a precipitated layer, measuring a volume of the precipitated layer, and, determining a ratio of the measured volume of the precipitated layer to a total volume 100 ml of hexane and surface treated calcium carbonate and.

14. The surface treated calcium carbonate for use in curable resin according to claim 13, wherein the surface treated calcium carbonate satisfies $0.005 \leq Dxp \leq 0.30$ (µm);

the surface treated calcium carbonate satisfies $10 \leq Dyp/Dxp \leq 150$, and the surface treated calcium carbonate satisfies $0.5 \leq D50 \leq 5.0$ (µm), wherein, in mercury intrusion porosimetry, Dxp is an average pore diameter at which an incremental quantity of mercury intrusion becomes a maximum value in a pore distribution with a range of 0.001 to 5.0 µm in pore size; Dyp is a maximum incremental quantity of mercury intrusion (ml/g); Dyp/Dxp is an average pore quantity; and D50 is a measure to represent a degree of dispersion of the calcium carbonate before surface treatment in a slurry.

\* \* \* \* \*